(No Model.) 2 Sheets—Sheet 2.

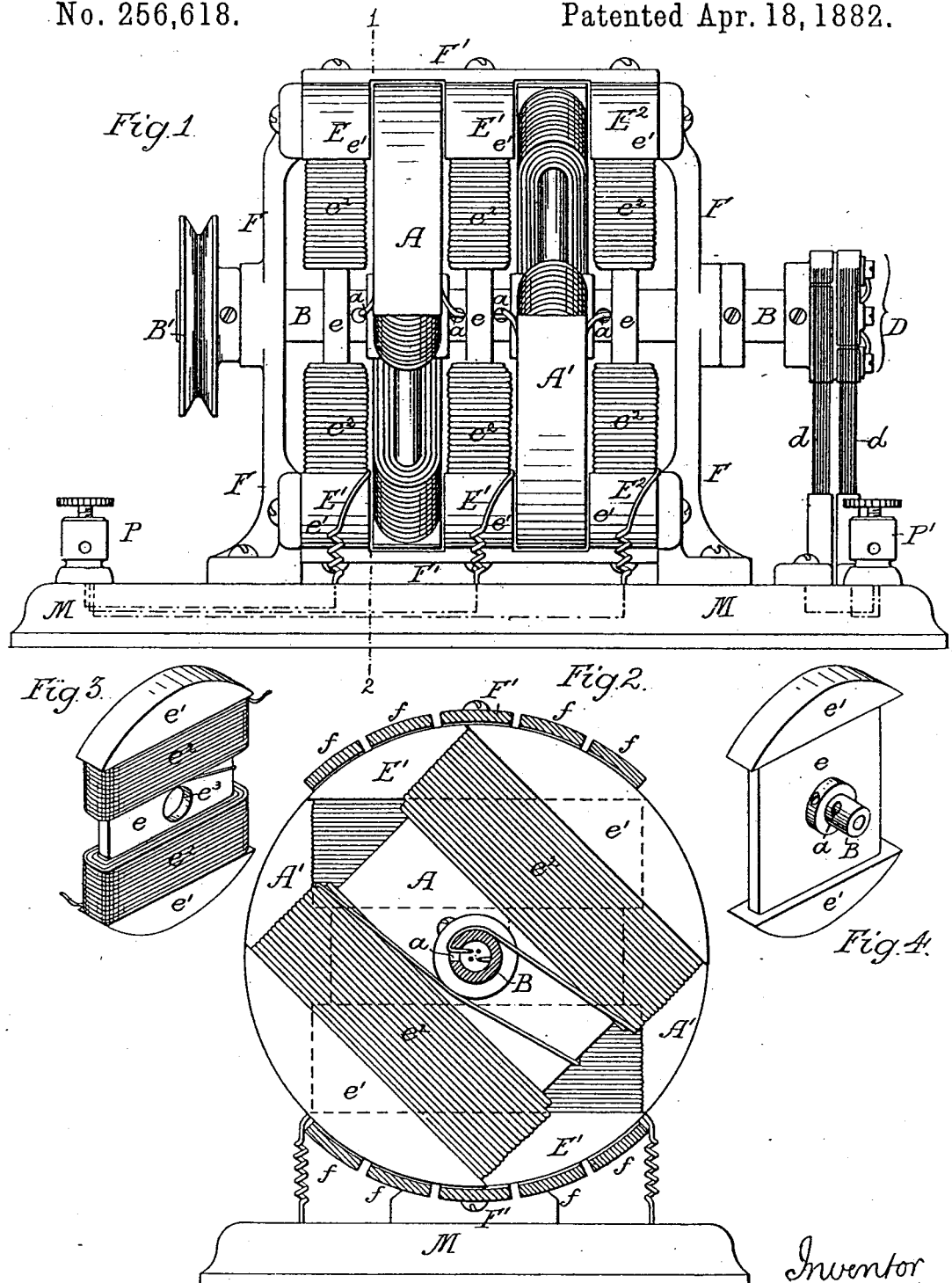

G. H. BANGS.
DYNAMO ELECTRIC MACHINE.

No. 256,618. Patented Apr. 18, 1882.

Witnesses
H L Fulenwider.
Harry Smith.

Inventor
George H. Bangs
by his Attorneys
Howson & Son

UNITED STATES PATENT OFFICE.

GEORGE H. BANGS, OF NEW YORK, N. Y.

DYNAMO-ELECTRIC MACHINE.

SPECIFICATION forming part of Letters Patent No. 256,618, dated April 18, 1882.

Application filed July 29, 1881. (No model.)

*To all whom it may concern:*

Be it known that I, GEORGE H. BANGS, a citizen of the United States, residing in New York city, New York, have invented certain Improvements in Dynamo-Electric Machines and Electric Motors, of which the following is a specification.

The object of my invention is to construct a simple, economical, and compact dynamo-electric machine or electric motor, and one in which the magnets shall be so constructed and arranged that they will exert their action to the best advantage; and this object I attain by constructing the field-magnets and armatures of flat webs of iron with enlarged polar extensions, and arranging them side by side, so that not only will the poles of the magnets react on each other, but also, owing to the flatness of the electro-magnets, the greatest practical amount of work will be obtained from the armatures and field-magnets, since the greatest practical extent of one magnet will be in close proximity to the next.

Figure 6:
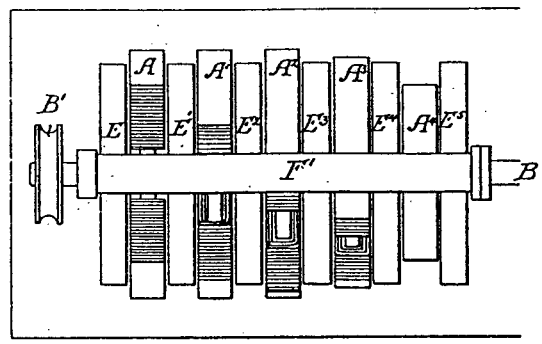
Figure 5:
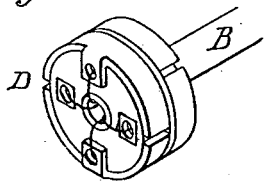
Figure 7:
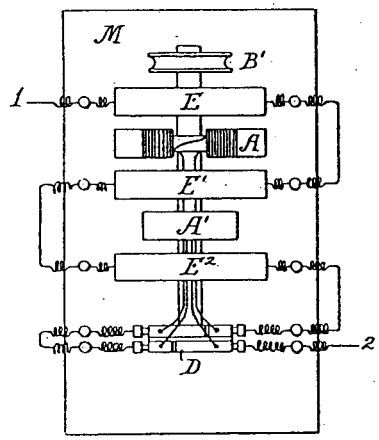
Figure 8:
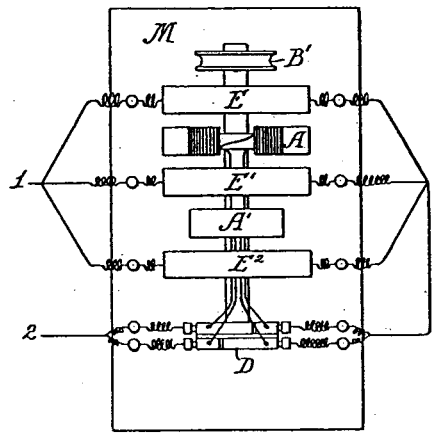

In the accompanying drawings, Figure 1, Sheet 1, is a side view of my improved machine; Fig. 2, a transverse section on the line 1 2, Fig. 1; Fig. 3, a perspective view of one of the field-magnets; Fig. 4, a perspective view of one of the armatures mounted on its hollow shaft; Fig. 5, Sheet 2, a perspective view of the commutator; Fig. 6, a plan view of a modification, and Figs. 7 and 8 diagrams showing the arrangement of circuits for intensity and quantity respectively.

In Figs. 1 and 2, A A' are the armatures, mounted on the hollow shaft B, which turns in bearings in the end pieces, F, of the frame, and carries at one end the pulley B', for receiving or transmitting the power, and at the other end the commutator D, whose brushes $d\ d$ may be carried by the base M of the machine. The armatures A A' are arranged between the field-magnets E E' E$^2$, which are connected together by the cross-pieces F', the latter being bolted to the opposite extremities of the field-magnets, while the end pieces, F, are bolted to the sides of the magnets E E$^2$, these fixed magnets thus practically forming a portion of the frame.

On reference to Fig. 3 it will be seen that each magnet consists of a comparatively thin and flat but broad web, $e$, of soft iron, with enlarged polar extensions $e'\ e'$ in the form of the segments of a cylinder, the acting or polar faces of these poles being their opposite flat sides. The flat plate $e$ is provided with the insulated wire-coils $e^2\ e^2$, nearly flush with the polar faces, the latter preferably projecting slightly beyond the wrapping, the flat sides of the helices as well as of the poles of adjoining armatures and field-magnets being, however, in the closest practicable juxtaposition. I prefer to leave an unwrapped portion at the center to allow for the free passage of the armature-shaft through the openings $e^3$.

The coils of the field-magnets are connected to suitable binding-posts, P. The armature electro-magnets are constructed like the field-magnets, except that instead of being provided with the central openings, $e^3$, for the free passage of the shaft, they fit accurately on the shaft and are provided with collars by which they may be screwed or keyed to the shaft, as shown in Fig. 4. The terminals of the coils of the armatures pass through openings $a$ in the hollow shaft B, and are led through the latter to the different sections of the commutator D. Each of the brushes $d$ is electrically connected to a binding-post, P', which, like the posts P, may be connected to the line or to the earth to complete the circuit. The openings $a\ a$ in the hollow shaft also serve, when the machine is in operation, to create a current of air between the electro-magnets and keep up a proper ventilation and cooling of the machine.

I prefer to arrange the magnets A A' on the shaft B at right angles to each other, so that when one magnet is exerting the least force or being acted on to the least extent the other will be at the point where it will produce the greatest effect or be acted on to the greatest extent.

I prefer, with the view of more effectively utilizing the power of the field-magnets, to connect the several field-magnets of each machine by iron strips $f\ f$, secured to the curved extremities of the poles, the piece F' also being of iron; or a single wide strip of metal extending over the entire poles at the top and bottom may be used instead of the strips. In such case not only the flat sides, but also the curved ends of the poles of an armature will constitute working-faces, acting in conjunction with the strips connecting the correspondingly-curved ends of the field-magnets.

The advantage of making the armatures and field-magnets with thin flat cores and enlarged polar extensions, so that with their wire wrappings they constitute a series of comparatively thin, flat, but broad electro-magnets arranged side by side, is that by this construction, in addition to the compactness of the arrangement, as much as possible of the field-magnets is brought into the closest practicable relation to as much as possible of the adjacent armature-magnets, so that they are constructed and arranged to the best advantage for the creation of the induced currents. The advantages of this construction are further promoted by making the plates forming the cores nearly square, as shown in Fig. 2, so that even when an armature is in a position at right angles to an adjacent field-magnet there will be about the same extent of adjacent surfaces.

I do not limit myself to the number or arrangement of field-magnets and armatures shown in Fig. 1, for the number may be continued indefinitely. For instance, in Fig. 6 I have shown a machine with five armatures and six field-magnets, the armatures in this case being set on the shaft with their poles out of line gradually, instead of being directly at right angles, as in the machine in Fig. 1—that is to say, while the armature A may be at right angles with the armature $A^4$, the intermediate armatures have their poles on lines intermediate between these two.

Instead of mounting the armatures on the shafts so as to rotate between field-magnets on each side, two armatures may be arranged side by side between two field-magnets, said field-magnets and armatures alternately presenting opposite poles.

My improved construction of dynamo-electric machine with field-magnets and armatures permits almost any desired arrangement of circuits without other change than at the binding-post connections. Thus the magnets may be coupled up in pairs, threes, or series, as the number of magnets and the work to be done may suggest. In the diagram, Fig. 7, for instance, I have shown the circuits arranged for intensity, the current entering, say, at 1, passing through the coils of the field-magnet E, thence through the coils of the magnets $E'$ $E^2$ successively, thence to one of the cummutator-brushes, thence to the coils of the armature A, thence back to the commutator-brushes and to the coils of the armature, $A'$, thence to the commutator and to the line at 2. In the diagram, Fig. 8, the electro-magnets are shown as coupled up for quantity in a manner which will be readily understood without further explanation.

Where there are a series of field-magnets and armatures some of the armatures—say A and $A'$ in Fig. 6—may be used to magnetize the field-magnets, the remaining armatures, $A^2$ $A^3$ $A^4$, being used for work, the currents from their coils being collected at their commutator for that purpose. In this case the poles of the armatures A $A'$ should be set at right angles, and the poles of the armatures $A^2$ $A^3$ $A^4$ should be set equidistant from each other.

Although I have described the machine as though it were a dynamo-electric machine, it will be understood that it may be used as an electric motor without any change in its construction.

I claim as my invention—

1. An electro-magnet for dynamo-electric machines or electric motors, consisting of a broad flat web of iron with enlarged polar extensions, and wire wrapping nearly flush with the flat sides of said polar extensions.

2. A dynamo-electric machine or electric motor having a series of stationary field-magnets and rotary armatures arranged side by side, and each consisting of a broad flat web of iron with enlarged polar extensions, and wire coils nearly flush with the flat sides of said polar extensions, all substantially as described.

3. The combination of a series of field-magnets, E $E'$, &c., of a dynamo-electric machine or electric motor having segment-shaped poles, with similarly-shaped rotary armatures, and a strip or strips of iron connecting the curved faces of the segmental poles of the field-magnets, substantially as specified.

In testimony whereof I have signed my name to this specification in the presence of two subscribing witnesses.

GEO. H. BANGS.

Witnesses:
HARRY DRURY,
HARRY SMITH.